(12) United States Patent
Jokela et al.

(10) Patent No.: US 11,057,342 B2
(45) Date of Patent: Jul. 6, 2021

(54) NETWORK ADDRESS TRANSLATION

(71) Applicant: Telefonaktiebolaget LM Ericsson (publ), Stockholm (SE)

(72) Inventors: Petri Jokela, Espoo (FI); Ari Keränen, Helsinki (FI); Jan Melén, Espoo (FI)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 665 days.

(21) Appl. No.: 15/527,107

(22) PCT Filed: Dec. 9, 2014

(86) PCT No.: PCT/SE2014/051470
§ 371 (c)(1),
(2) Date: May 16, 2017

(87) PCT Pub. No.: WO2016/093748
PCT Pub. Date: Jun. 16, 2016

(65) Prior Publication Data
US 2017/0346788 A1      Nov. 30, 2017

(51) Int. Cl.
*H04L 12/64*      (2006.01)
*H04L 29/12*      (2006.01)
*H04L 12/741*     (2013.01)

(52) U.S. Cl.
CPC ...... *H04L 61/2521* (2013.01); *H04L 12/6418* (2013.01); *H04L 45/74* (2013.01); *H04L 2012/6443* (2013.01)

(58) Field of Classification Search
USPC .................................. 709/220–224, 227–229
See application file for complete search history.

(56) References Cited

U.S. PATENT DOCUMENTS 6,128,298 A * 10/2000 Wootton ................. H04L 12/66
                                                370/392
7,302,496 B1    11/2007 Metzger
(Continued)

FOREIGN PATENT DOCUMENTS

EP    2693717 A1    2/2014
WO    2011091897 A1    8/2011

OTHER PUBLICATIONS

Petri Jokela, Heikki Mahkonen, Christian Esteve Rothenberg, Jorg Ott; "(Deployable) Reduction of Multicast State with In-packet Bloom Filters" IFIP Networking Confrrence, May 22-24, 2013, Brooklyn, NY, IEEE, pp. 1-9 (Year: 2003).*

(Continued)

*Primary Examiner* — Younes Naji
*Assistant Examiner* — Da T Ton
(74) *Attorney, Agent, or Firm* — Withrow & Terranova, PLLC

(57) ABSTRACT

There is provided a method for network address translation. The method is performed by a gateway. The method comprises acquiring an in-packet Bloom Filter (iBF) representation of a node. The method comprises embedding an indication of the iBF representation in an IP address, thereby enabling translation of the iBF representation of the node to an IP address of the node. There is also presented a gateway configured to perform such a method and a computer program comprising computer program code which, when run on a processing unit of the gateway, causes the processing unit to perform such a method.

17 Claims, 4 Drawing Sheets

(56) References Cited

U.S. PATENT DOCUMENTS

| | | | |
|---|---|---|---|
| 8,230,071 B1 | 7/2012 | Quilter et al. | |
| 2006/0259639 A1* | 11/2006 | Aken | H04L 29/12009 709/245 |
| 2007/0091828 A1* | 4/2007 | Ashwood-Smith | H04L 29/12783 370/256 |
| 2013/0124757 A1* | 5/2013 | Norrman | H04L 63/06 709/242 |
| 2014/0036912 A1 | 2/2014 | Hui et al. | |
| 2016/0112254 A1* | 4/2016 | Levy-Abegnoli | H04L 41/0803 709/220 |

OTHER PUBLICATIONS

Bisalbutra, Sarantorn, "Publish/Subscribe Gateway for Real-time Communication," Thesis submitted for examination for the degree of Master of Science in Technology, Nov. 19, 2012, Aalto University School of Electrical Engineering, 49 pages.

Farrel, Adrian et al., "A Path Computation Element (PCE)-Based Architecture," Network Working Group, Request for Comments: 4655, Category: Informational, Aug. 2006, The Internet Society, pp. 1-40.

Jokela, Petri et al., "(Deployable) Reduction of Multicast State with In-packet Bloom Filters," IFIP Networking Conference, May 22-24, 2013, Brooklyn, NY, IEEE, pp. 1-9.

Jokela, Petri et al., "Lipsin: Line Speed Publish/Subscribe Inter-Networking," Special Interest Group on Data Communications (SIGCOMM), Aug. 17-21, 2009, Barcelona, Spain, ACM, 12 pages.

International Search Report and Written Opinion for International Patent Application No. PCT/SE2014/051470, dated Sep. 17, 2015, 9 pages.

Extended European Search Report for European Patent Application No. 14908028.5, dated Jun. 11, 2018, 9 pages.

Krol, M., et al., "Featurecase: Data-Centric Group Commincation; draft-krol-core-featurecase-00," Grenoble Institute of Technology, Nov. 25, 2014, IETF Trust, 12 pages.

Examination Report for European Patent Application No. 14908028.5, dated Apr. 24, 2020, 8 pages.

* cited by examiner

NETWORK ADDRESS TRANSLATION

This application is a 35 U.S.C. § 371 national phase filing of International Application No. PCT/SE2014/051470, filed Dec. 9, 2014, the disclosure of which is incorporated herein by reference in its entirety.

TECHNICAL FIELD

Embodiments presented herein relate to network address translation, and particularly to a method, a gateway, a computer program, and a computer program product for network address translation.

BACKGROUND

In communications networks, there may be a challenge to obtain good performance and capacity for a given communications protocol, its parameters and the physical environment in which the communications network is deployed.

For example, one example of an approach for communications in communications networks is information-centric networking (ICN). ICN may be regarded as an approach to evolve the Internet infrastructure away from a host-centric paradigm based on perpetual connectivity and the end-to-end principle, to a network architecture in which the focal point is so-called named information (or named content or named data). In this paradigm, connectivity may well be intermittent, end-host and in-network storage can be capitalized upon transparently, as bits in the network and on storage devices have exactly the same value, mobility and multi access are the norm and anycast, multicast, and broadcast are natively supported.

The ICN paradigm thus instead of being based on addressing hosts relies on addressing information and further introduces a concept of scopes. Thereby, instead of defining addresses and paths to resources, hierarchies of scopes and resources within those scopes can be defined. The resources are then allowed to be addressed without the need to define server(s) where those resources are hosted. A simple example of an ICN scope would be lights of a room in a house. These can, for example, be presented as a scope "house:kitchen:lights" or "house:livingroom:lights". A single resource, say "lights", may also belong to multiple scopes, e.g.: "house:groundfloor:light1" and "house:kitchen:light1". The ICN rendezvous layer will translate the scopes into instructions for the forwarding layer that will in turn forward the queries for a resource to the correct server.

One common way to implement the forwarding layer instructions is called in-packet Bloom Filters (iBFs). In general terms, a Bloom filter is a space-efficient probabilistic data structure that is used to test whether an element is a member of a set or not. With iBFs the rendezvous system combines all link IDs (LIDs) needed to reach the correct host(s) into a Bloom filter that is attached to the packet that is to be forwarded in the ICN network.

The application of in-packet Bloom filters in communications networks is as such known in the art. In general terms, iBF packet forwarding is based on unidirectional LIDs that identify an outgoing link from a node. A set of LIDs are compressed into a Bloom filter to identify a path through the network. A LID is meaningful only at the node, where it is configured on an outgoing interface.

In order for hosts from the regular Internet using Internet Protocol (IP) addresses to communicate with hosts in an ICN network using iBFs, a translation between the two different addressing methods is needed. An example of high-level message conversion using Session Initial Protocol (SIP) signaling has been proposed, although without considering address translation; the mapping for the traffic is handled using higher protocol stack layers where edge routers act as application level gateways.

The paper entitled "(Deployable) Reduction of Multicast State with in-packet Bloom Filters" by Jokela et al in the Proceedings of IFIP Networking 2013 addresses only situations where both endpoints use IP addresses, and where iBFs are used in the transit network in between. If one of the endpoints resides in an iBF network and the other in an IP network, a translation between the two in a way that both are addressable from each network is needed. While such translation could be manually configured for a gateway device between the two networks, such static configurations are known to 3o scale poorly and a more automatic solution is desired.

Hence, there is a need for improved address translation between iBFs and IP addresses.

SUMMARY

An object of embodiments herein is to provide efficient address translation between iBFs and IP addresses.

According to a first aspect there is presented a method for network address translation. The method is performed by a gateway. The method comprises acquiring an in-packet Bloom Filter (iBF) representation of a node. The method comprises embedding an indication of the iBF representation in an IP address, thereby enabling translation of the iBF representation of the node to an IP address of the node.

Advantageously this provides efficient address translation between iBFs and IP addresses.

Advantageously, this enables hosts and nodes from an IP Internet network to communicate with nodes in an iBF-based network.

Advantageously, the IP address of the node appears like a regular IP address. The IP address of the node may thus advantageously be e.g., stored in a Domain Name System (DNS) server or looked up from other regular IP directory services.

Advantageously, this allows for efficient scaling of the gateway since it does not require manual configuration of IP addresses for the nodes.

According to a second aspect there is presented a gateway for network address translation. The gateway comprises a processing unit. The processing unit is configured to acquire an in-packet Bloom Filter (iBF) representation of a node. The processing unit is configured to embed an indication of the iBF representation in an IP address, thereby enabling translation of the iBF representation of the node to an IP address of the node.

According to a third aspect there is presented a computer program for network address translation, the computer program comprising computer program code which, when run on a processing unit of a gateway, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
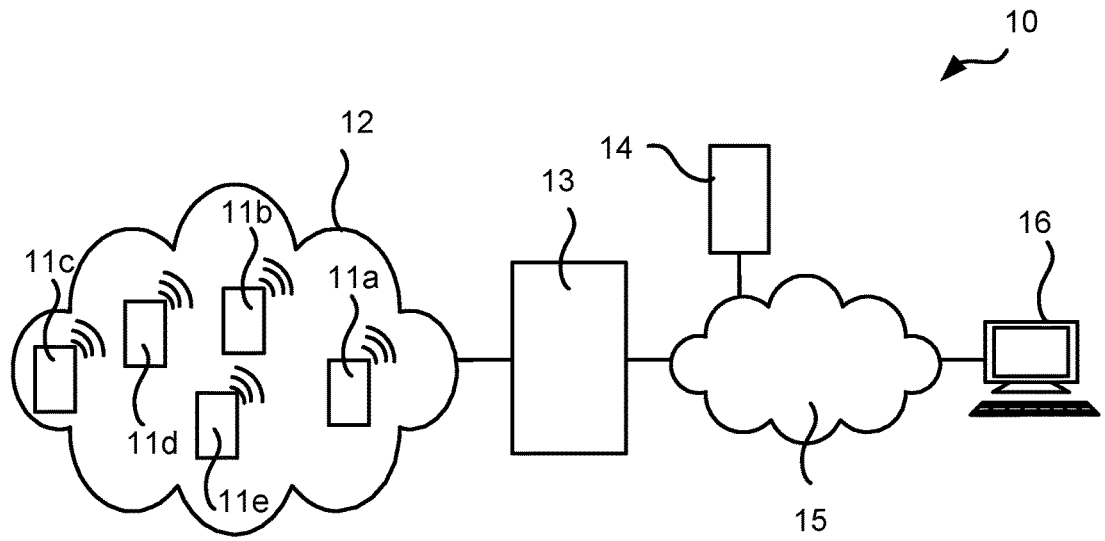
FIG. 1 is a schematic diagram illustrating a communication network according to embodiments.

FIG. 1 is a schematic diagram illustrating a communications network 10 where embodiments presented herein can be applied. The communications network 10 comprises nodes 11a, 11b, 11c, 11d, 11e. Each node 11a-e may be a portable wireless device, such as an Internet-of-Things (IoT) device, a sensor, etc. The nodes 11a-e are operatively connected to an ICN network 12, such as a wireless ad hoc network. In turn, the ICN network 12 is operatively connected to an IP Internet network 15 via a gateway 13. The gateway 13 acts as an address translator for the nodes 11a-e. Further details this address translation will be provided below. A Domain Name System (DNS) server 14, and an IP node 16 are also operatively connected to the IP Internet network 15. By means of the gateway 13, communication and exchange of data may occur between the nodes 11a-e and the IP node 16.

In the ICN network, the nodes 11a-e are addressed by means of iBF representations. Such iBF representations may be provided either for a 1-to-1 connection (i.e. between the gateway 13 and a node 11a-e in the ICN network 12) or for a 1-to-many connection (i.e. between the gateway 13 and a set of at least two nodes 11a-e in the ICN network 12). The first type of iBF representations may be used for normal connection between two nodes, and the latter for multicasting traffic to the nodes 11a-e in the ICN network 12.

In general terms, iBF representations may be generated in various ways. They may be generated, for example, by using a separate Topology Manager (TM) function that may be provided in a separate node, or the TM functionality can be distributed in the network. Another alternative is to use reverse iBF representation collection when a packet is delivered hop-by-hop through the ICN network 12.

In the first alternative, a link-state protocol may be used to collect network topology information, including the LIDs of the interfaces, into one location. This location can be e.g. a Path Computation Element (PCE), or edge nodes when the Open Shortest Path First (OSPF) routing protocol is enhanced so that it carries also LIDs with the rest of the ICN network information.

The second alternative is based on including a separate iBF collector field in packets communicated in the ICN network 12, where a node, say node 11a, forwarding a packet may include the incoming interfaces LID in a collector field using a logical OR operation and forward the packet further using the forwarding iBF representation in the packet (or broadcasts it further to all destination nodes 11b-e, in case of a broadcast packet). When the packet arrives at the destination node, say node 11c, the collector field may thus contain a reverse direction iBF representation that may be used to send the packet in the other direction (i.e., towards the gateway 13).

According to embodiments, the gateway 13 broadcasts to the ICN network 12 to inform that it is acting as a gateway to the IP network 15. This broadcast packet may comprise the collector field, and, thus, when a node 11a-e receives the broadcast packet, it may from the collector field obtain the iBF representation that leads to the gateway 13. If a node 11a-e needs to be reachable from the Internet side of the network (i.e. from the IP node 16) then the node 11a-e may send a request to the gateway 13 that the collected iBF representation needs to be registered to the DNS server 14. As will be further disclosed below, the gateway 13 may then generate a full IP address of the node 11a-e using the iBF representation to the node 11a-e and, for example, an IP address prefix assigned to the gateway 13. After generating the full IP address, the gateway 13 may use e.g. a dynamic DNS procedure to update a DNS table of the DNS server 14 to which the corresponding IP node 16 belongs to. An authorization key may be received in the request packet or may be delivered using an off-path mechanism.

At least some of the embodiments disclosed herein relate to efficient mechanisms for communicating between nodes 11a-e in the ICN network 12 and entities in, or operatively connected to, the IP network 15. According to at least some of the embodiments disclosed herein this is achieved by embedding iBF representations in IPv6 address suffixes. The embodiments disclosed herein particularly relate to network address translation. In order to obtain such network address translation there is provided a gateway 13, a method performed by the gateway 13, a computer program comprising code, for example in the form of a computer program product, that when run on a processing unit of the gateway 13, causes the processing unit to perform the method.

Figure 2A:
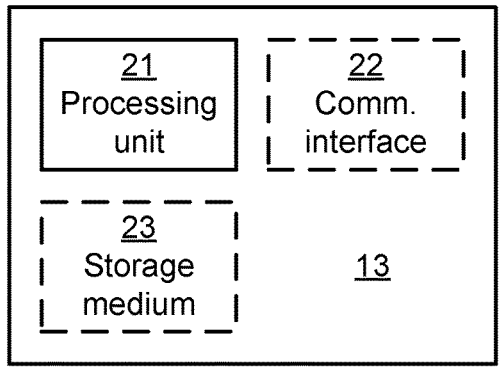
FIG. 2a is a schematic diagram showing functional units of a gateway according to an embodiment.

FIG. 2a schematically illustrates, in terms of a number of functional units, the components of a gateway 13 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The gateway 13 may further comprise a communications interface 22 for communications with the IP network 15 and at least one of the nodes 11a-e. As such the communications interface 22 may comprise one or more transmitters and receivers, comprising analogue and digital components and a suitable number of antennas for radio communications and interfaces for wireline communications. The processing unit 21 controls the general operation of the gateway 13 e.g. by sending data and control signals to the communications interface 22 and the storage medium 23, by receiving data and reports from the communications interface 22, and by retrieving data and instructions from the storage medium 23. Other components, as well as the related functionality, of the gateway 13 are omitted in order not to obscure the concepts presented herein.

Figure 2B:
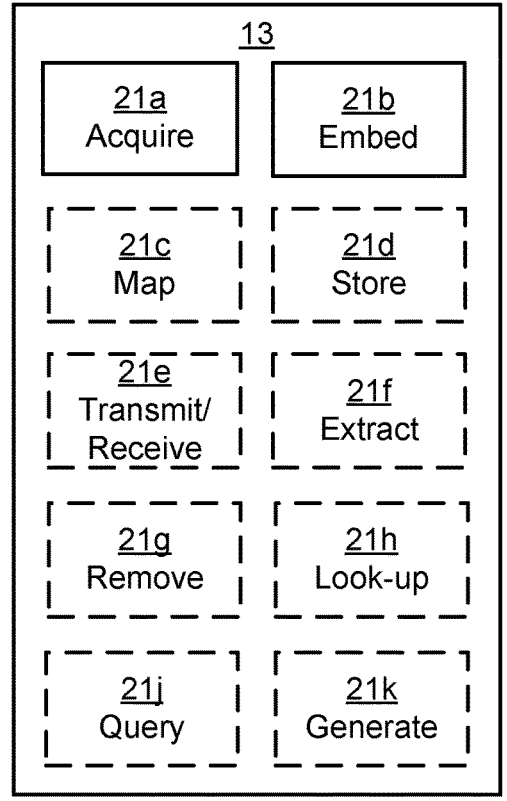
FIG. 2b is a schematic diagram showing functional modules of a gateway according to an embodiment.

FIG. 2b schematically illustrates, in terms of a number of functional modules, the components of a gateway 13 according to an embodiment. The gateway 13 of FIG. 2b comprises a number of functional modules; an acquire module 21a configured to perform below step S102, and an embed module 21b configured to perform below step S104. The gateway 13 of FIG. 2b may further comprises a number of optional functional modules, such as any of a map module 21c configured to perform below step S104a, a store module 21d configured to perform below steps S104b, S104c, a transmit and/or receive module 21e configured to perform below steps S106, S110, S112, S118, an extract module 21f configured to perform below step S108, a remove module 21g configured to perform below step S106a, a look-up module 21h configured to perform below step S106b, a query module 21j configured to perform below step S114, and a generate module 21k configured to perform below step S116. The functionality of each functional module 21a-k will be further disclosed below in the context of which the functional modules 21a-k may be used. In general terms, each functional module 21a-k may be implemented in hardware or in software. Preferably, one or more or all functional modules 21a-k may be implemented by the processing unit 21, possibly in cooperation with functional units 22 and/or 23. The processing unit 21 may thus be arranged to from the storage medium 23 fetch instructions as provided by a functional module 21a-k and to execute these instructions, thereby performing any steps as will be disclosed hereinafter.

Figure 3:
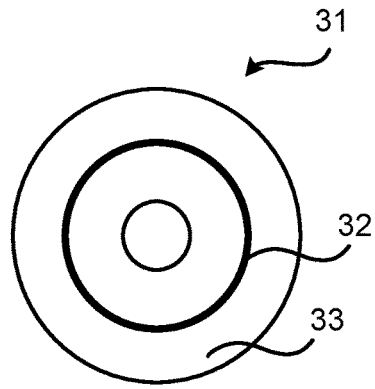
FIG. 3 shows one example of a computer program product comprising computer readable means according to an embodiment.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 4:
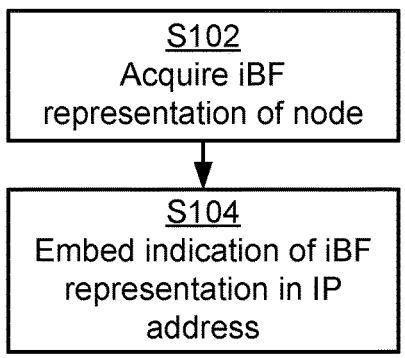
FIGS. 4 and 5 are flowcharts of methods according to embodiments.
Figure 5:
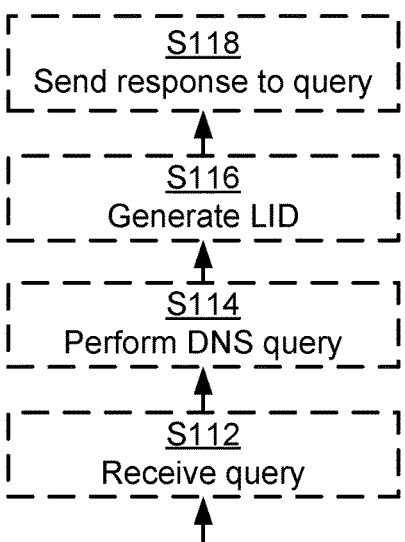
Figure 5:
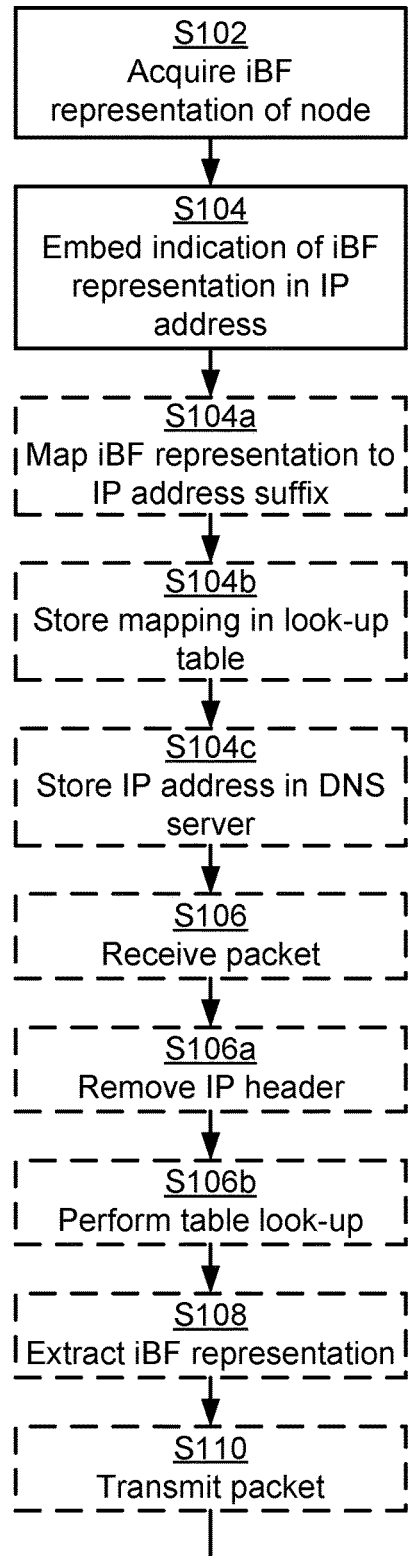

FIGS. 4 and 5 are flow chart illustrating embodiments of methods for network address translation. The methods are performed by the gateway 13. The methods are advantageously provided as computer programs 32.

Reference is now made to FIG. 4 illustrating a method for network address translation according to an embodiment. The method is performed by the gateway 13.

The network address translation is based on associating an in-packet Bloom Filter (iBF) representation of a node 11a-e with an IP address of the node 11a-e. The gateway 13 is therefore configured to, in a step S102, acquire an iBF representation of a node 11a-e.

The network address translation is further based on embedding at least an indication of the iBF representation of the node 11a-e in an IP address. Hence, the gateway 13 is configured to, in a step S104, embed an indication of the iBF representation in an IP address 62. This enables translation of the iBF representation of the node 11a-e to an IP address of the node 11a-e. Examples of how the indication of the iBF representation may be embedded in the IP address 62 will be provided below.

The iBF representation of a node 11a-e may identify a path from the gateway 13 to that node 11a-e.

The iBF representation of the node 11a-e may be based on information provided by a path computational element (PCE).

The iBF representation of the node 11a-e may be based on a separate iBF collector field.

As disclosed above, the node 11a-e may be a node in an ICN network 12. The gateway 13 disclosed herein thus enables communications between nodes 11a-e in the ICN network 12 entities in, or operatively connected to, the IP network 15.

Once a mapping between iBF representations and IP addresses has been created at the gateway 13, any IP node 16 may send IP packets to nodes 11a-e in the ICN network 12 using these specifically crafted IP addresses.

As will be further disclosed below, this method enables, when packets reach the gateway 13 from the IP network 15, the gateway 13 to translate the IP address, for example based on the suffix, into an iBF representation, which is in turn used to deliver the packet through the ICN network 12 to the correct node 11a-e.

As will be further disclosed below, this method enables, for the return direction, the gateway 13 to create a LID mapping for the source address of the IP node 16 and include this in the collecting iBF representation received from the node 11a-e.

When the packet is delivered to the node 11a-e in the ICN network 12, it may thus comprise the collected iBF representation to the gateway 13, including the gateway internal LID that maps return packets to the IP address of the IP node 16.

This mapping needs to be done only for the first time and during the rest of the communication the same iBF representation may be used to deliver packets from the nodes 11a-e to the gateway 13 and further to the IP node 16.

Further embodiments relating to these as well as to further details of network address translation will now be disclosed.

There may be different ways for the gateway 13 to embed the indication of the iBF representation in the IP address 62. Different embodiments relating thereto will now be described in turn.

Figure 6:
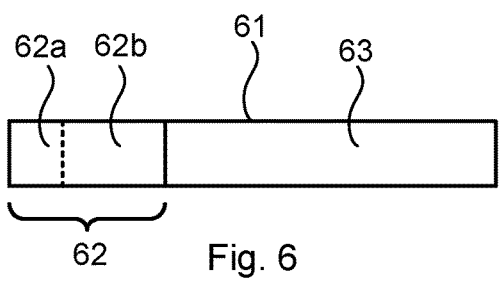
FIG. 6 schematically illustrates a packet according to an embodiment.

FIG. 6 schematically illustrates an IP packet 61 according to an embodiment. The IP packet 61 comprises an IP header 62 and a payload field 63. The IP header 62 may comprise a first part 62a and a second part 62b. The first part 62a may be an IP address prefix and the second part 62b may be an IP address suffix.

For example, a first part 62a of the IP address 62 of the node 11a-e may comprise at least a partial IP address of the gateway 13. Hence, there may be a relation between the IP address of the gateway 13 and the IP addresses of all nodes 11a-e associated with this gateway 13. Particularly, the first part 62a of the IP address 62 may be a prefix of the IP address 62 of the node 11a-e.

For example, a second part 62b of the IP address 62 of the node 11a-e may comprise the indication embedded in step S104 of the iBF representation. Particularly, the second part 62b of the IP address 62 may be a suffix of the IP address 62 of the node 11a-e.

Reference is now made to FIG. 5 illustrating methods for network address translation according to further embodiments. The methods are performed by the gateway 13.

For example, the gateway 13 disclosed herein may embed the indication of the iBF representation by mapping the iBF representation to the IP address 62 by including a full iBF representation in the IP address suffix 62b. That is according to embodiments, the indication embedded in step S104 may be the iBF representation itself.

For example, the gateway 13 disclosed herein may embed the indication of the iBF representation by mapping the iBF representation to the IP address 62 by dynamically creating mappings from iBF representations to IP addresses/suffixes. That is according to embodiments, the gateway 13 is configured to determine the indication by, in an optional step S104a, mapping the iBF representation to an IP address suffix 62b; and in an optional step S104b storing the mapping in a look-up table, wherein the indication is defined by this mapping. The indication may thus be provided as an index, where the index of a node 11a-e points at the mapping between iBF representation and IP address for that particular node 11a-e.

Further, the thus generated IP address of the node 11a-e may be stored in a DNS server 14. Thus, according to embodiments, the gateway 13 is configured to, in an optional step S104c, store the IP address of the node 11a-e in the DNS server 14.

When a forwarding iBF representation for some information or a node 11a-e in the ICN network 12 is generated using any of the aforementioned mechanisms, a matching IP address 62 of the node 11a-e is thus created at the gateway 13 and the IP address 62 may be stored (e.g., in a DNS server 14 or other directory) and later discovered by an IP node 16 in the IP network 15.

When the IP node 16 sends an IP packet to that IP address in order to access the node 11a-e or information of the node 11a-e, the packet is initially delivered to the gateway 13 through the IP network 15 using, for example, the IP address prefix 62a that belongs to the gateway 13. As will be further disclosed below, the gateway 13 may then extract the iBF representation from the IP address 62 by performing the reversed operations of the embedding of the iBF representation into the IP address 62.

There may be different ways for the gateway 13 to handle packets received from the IP network 15 and addressed to nodes 11a-e in the ICN network 12. Different embodiments relating thereto will now be described in turn.

Particularly, the gateway 13 may be configured to, in an optional step S106, receive a packet 61 comprising the IP address 62 of the node 11a-e from an IP node 16. For example, for packets received from the IP network 15 the gateway 13 may translate the IP address back into an iBF representation. Particularly, the gateway 13 may be configured to, in an optional step S108, extract the iBF representation from the IP address 62 of the node 11a-e. Different ways for the gateway 13 to extract the iBF representation from the IP address 62 will be disclosed below. The gateway 13 may then forward the packet to the ICN network 12 using the iBF representation. Particularly, the gateway 13 may be configured to, in an optional step S110, transmit the packet 61 using the iBF representation towards the node 11a-e.

Particular examples of how the gateway 13 may extract the iBF representation from the IP address 62 will now be disclosed.

For example, the gateway 13 may remove the IP header and retrieve the iBF representation from the destination IP address. Particularly, the gateway 13 may be configured to, in an optional step S106a, remove an IP header from the packet 61 and retrieve the iBF representation from the IP address so as to extract the iBF representation from the IP address 62.

In the stateless method the whole iBF is stored in the IP address suffix. In case of IPv6, the last 64 bits (the interface identifier part) can be used for the iBF. If the ICN network 12 uses larger iBFs, potentially more bits can be allocated from the IPv6 address prefix for this purpose by acquiring a bigger block from the Internet Service Provider (ISP).

For example, the IP address suffix may be used to allow a table lookup to determine the iBF representation. Particularly, the gateway 13 may be configured to, in an optional step S106b, perform a table look-up to map the IP address to the iBF representation so as to extract the iBF representation from the IP address 62. The IP address suffix 62b may thus be used to perform a lookup to discover the iBF representation that should be used for the packet 61. This may require the gateway 13 to store the mapping between each iBF representation and IP address. This mapping may be performed, e.g., when the node 11a registers itself to the gateway 13. The gateway 13 may creates an IP address 62 for the node 11a and configure it. This IP address 62 may thus mapped to the iBF representation of the node 11a and when a packet arrives to that IP address, the IP header may be removed and the corresponding iBF representation may be used to deliver the packet to the destination node 11a.

In case of IPv4, only some few bits in the IP address suffix are available for storing the iBF representations, or indexes to them for network address translation, but transport layer (e.g., UDP or TCP) ports can be used for additional 16 bits of space for storing the iBF representations.

Figure 7:
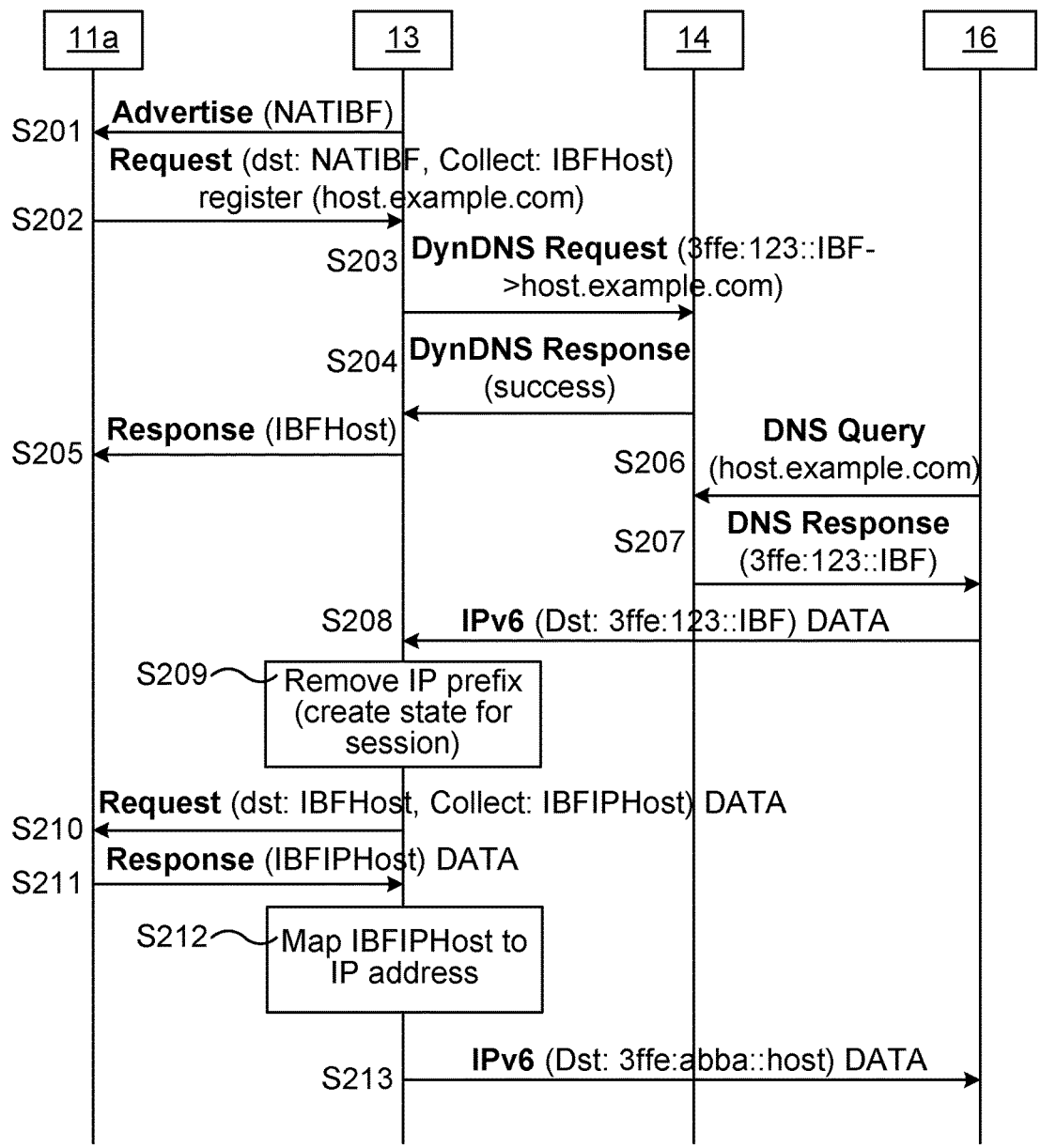
FIGS. 7 and 8 are signalling diagrams according to embodiments.

When an IP packet with an embedded iBF representation in its IP address suffix 62b arrives at the gateway 13, the gateway 13 may remove the IP header, retrieve the iBF representation from the destination IP address 62 and deliver the packet to the ICN network 12, finally reaching the destination node 11a-e. Further details thereof will now be disclosed with reference to the signalling diagram of FIG. 7.

S201: The gateway 13 advertises itself by transmitting an Advertise (NATIBF) message. In this message, an iBF representation is collected that leads from the node 11a to the gateway 13.

S202: Once the advertise message has arrived, the node 11a stores the iBF representation to the gateway 13 and sends a Request(dst:NATIBF, Collect:IBFHost) message and a register (host. Example.com) message to the gateway 13 to register itself. This message collects the iBF representation that the gateway 13 uses to send packets to that node 11a. The gateway 13 stores the received iBF representation and information about the node 11a.

S203: The gateway 13 registers the node 11a in the DNS server 14 by sending a DynDNS Request(3ffe:123::IBF->host.example.com) to the DNS server 14. It registers this node 11a (host.example.com) with an IP address that it generates according to embodiments as disclosed herein.

S204: Upon successful registration the DNS server 14 responds to the gateway 13 with a DynDNS Response (success) message.

S205: The gateway forwards the DynDNS Response (success) message in a Response (IBFHost) to the node 11a.

S206: The IP node 16 initiates communication with the node 11a by transmitting a DNS Query (host.example.com) message to the DNS server 14 so as to query the DNS server 14 (DNS Query/DNS Response).

S207: The DNS server in a DNS Response (3ffe:123::IBF) provides the IP address assigned to the node 11a to the IP node 16.

S208: The IP node 16 uses the received IP address of the node 11a to initiate the communication. The IP network 15 may use the prefix of the IP address to route the packet sent by the IP node 16 through the IP network 15, the packet finally reaching the gateway 13.

S209: The gateway 13 creates a session for the connection. It creates a local Link Identity Tag, LIT, and maps that LIT to the IP address provided from the IP node 16. In this respect, a LID may be used as a single identifier for an outgoing interface whereas a LIT may be used when the single LID is replaced by a set of identifiers. The gateway 13 converts the IP address into an iBF representation of the node 11a according to embodiments as disclosed herein.

S210: The gateway 13 sends a data request message, Request(dst: IBFHost, Collect: IBFIPHost) DATA, to the node 11a host using this iBF representation. The gateway 13 includes also the iBF collector field in the message, where the gateway 13 initially inserts the local LIT it created for the external IP node's 16IP address.

S211: The node 11a responds with a Response(IBFIPHost) DATA message using the iBF representation that was collected in the connection Request message.

S212: When the gateway 13 receives this Response message, it verifies also the LITs that are in its database, and finds the correct IP address of the IP node 16 where the packet needs to be sent. It converts the packet to an IP packet and sets the destination IP address to the one found from its database.

S213: The gateway 13 sends the packet to the external IP node 16.

There may be different ways for the gateway 13 to handle packets received from nodes 11a-e in the ICN network 12 and addressed to the IP network 15. Different embodiments relating thereto will now be described in turn.

For example, the gateway 13 may receive a destination address query from the node 11a. The gateway 13 may thus be configured to, in an optional step S112, receive a destination address query of an IP node 16 from the node 11a. In response thereto the gateway 13 makes a DND query. Hence, the gateway 13 may be configured to, in an optional step S114 perform a DNS query of the IP node 16 so as to receive an IP address of the IP node 16. When the gateway 13 receives the IP address of the destination IP node 16 it creates a local LID that points to the IP address. Hence, the gateway 13 may be configured to, in an optional step S116, generate a LID pointing to the IP address of the IP node 16, thereby mapping the LID to the IP address of the IP node 16. The gateway 13 may then send a response to the node 11a. That is, the gateway 13 may be configured to, in an optional step S118, send a response to the destination address query to the node 11a. The gateway 13 may thereby collect a new IBF representation, where the first inserted LID is the newly created LID that points to the IP address of node 17. The node 11a may receive the collected iBF representation that comprises the path from the node 11a to the gateway 13 and the LID that the gateway 13 may use to find the IP address of the IP node 16.

Connection initialization from the node 11a to an IP node 16 in the IP network 15 may start with a destination address query from the node 11a. The node 11a may send the query to the gateway 13, that queries further the destination IP node's 16 IP address from an external DNS server 14. When the gateway 13 receives the IP address of the IP node 16, the gateway 13 may create a local LID that points to the newly received IP address of the IP node 16. The gateway 13 may then reply to the node 11a with a response packet, containing an iBF collector field. In this field, the gateway 13 adds the local LID pointing to the IP address of the IP node 16. When the response packet arrives to the node 11a, the response packet comprises the iBF representation (of the gateway 13) to which the node 11a may send traffic destined to IP node 16. When such a packet arrives at the gateway 13, the last LID matches the IP address of the IP node 16 and the gateway 13 may insert the IP header comprising the IP address of the IP node 16 as the destination and as the source the prefix:iBF representation combination, where the iBF representation leads from the gateway 13 to the initiating node 11a.

Figure 8:
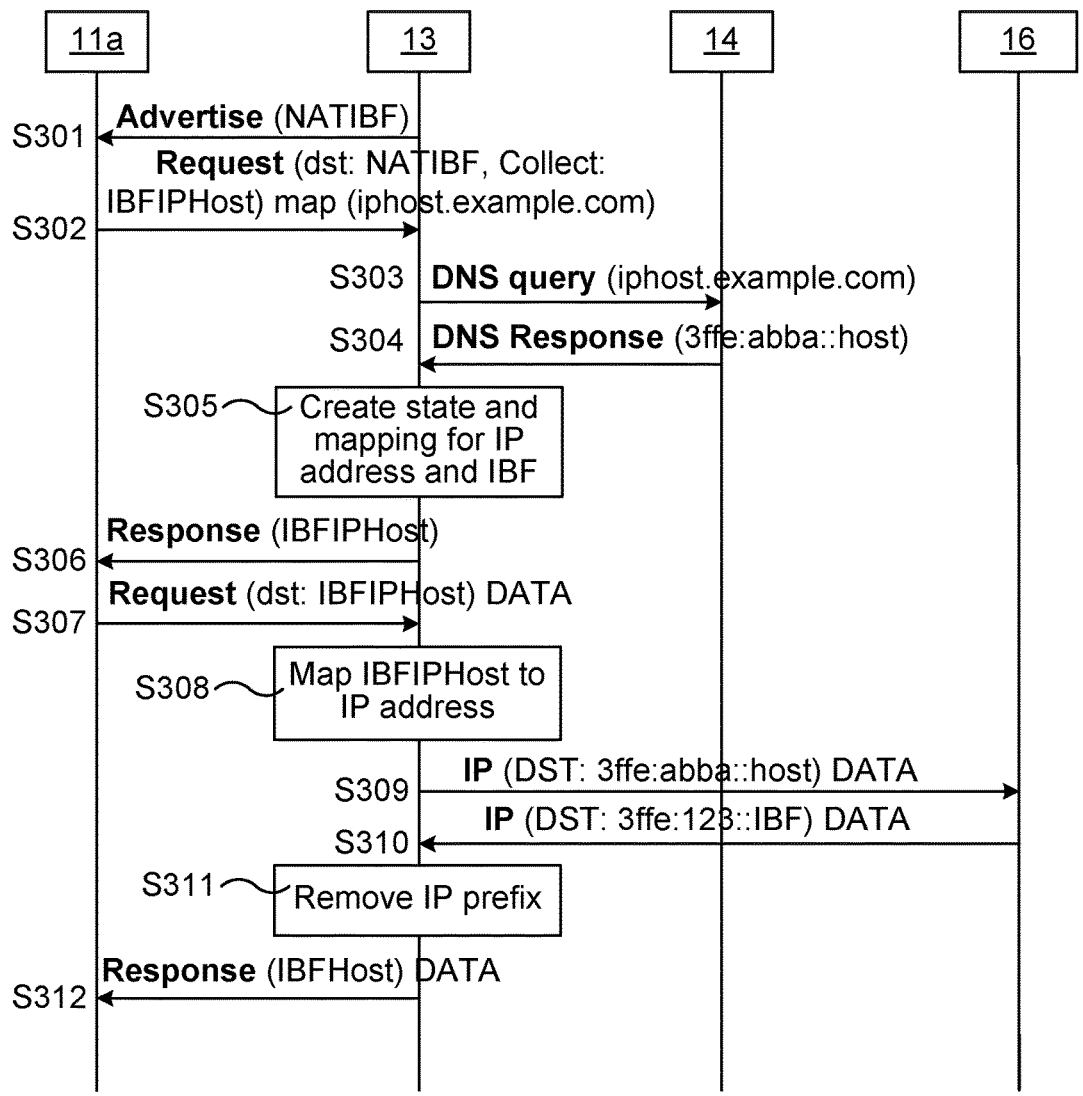

Connection initialization from the IP node 16 to the node 11a may start with a DNS query. The IP node 16 may receive the IP address of the node 11a, which IP address may comprise the iBF representation of the node 11a in the IP address suffix. The IP node 16 may send a connection initialization message, which message is routed to the gateway 13. The gateway 13 retrieves the iBF representation of the node 11a from the destination IP address and sends the packet to the ICN network 12. For a new connection initialization, the gateway 13 may create, again, a local LID and map it to the IP address of the IP node 16. As above, this local LID may be included in the collector field of the initialization packet. The gateway 13 sends the packet to the ICN network 12. Again, the node 11a acquires the new destination iBF representation (of the gateway 13) in the collector field in the packet and may thus reply to the received packet. At the gateway 13, the packet may be forwarded to the correct destination IP node 16. Further details thereof will now be disclosed with reference to the signalling diagram of FIG. 8.

S301: The gateway 13 advertises itself by transmitting an Advertise(NATIBF) message. In this message, an iBF representation is collected that leads from the node 11a to the gateway 13.

S302: Once the advertise message has arrived, the node 11a stores the iBF representation to the gateway 13 and sends a request message, Request(dst: NATIBF, Collect:

IBFIPHost) map (iphost.example.com), to the gateway 13. The node 11a indicates the host name of the destination IP node 16 (iphost.example.com) and also collects the iBF representation for the gateway 13 to node 11a connection. In a fixed environment, this collection does not always needs to be performed, but may only be performed during the first message exchange between the gateway 13 and node 11a, where both the iBF representation from the gateway 13 towards the node 11a and from the node 11a towards the gateway 13 are collected.

S303: The gateway 13 queries the DNS server 14 for the external IP node 16 (iphost.example.com).

S304: The DNS server 14 responds to the query in step S303 by sending a DNS Response (3ffe:abba::host) message to the gateway 13 so that the gateway receives the IP address of the IP node 16.

S305: The gateway 13 creates a local LIT and makes a mapping from the LIT to the IP address and to the iBF representation towards the node 11a. This iBF representation is used to create the source IP address (i.e., the IP address of the node 11a) for the outgoing packets.

S306: The gateway 13 creates a response message, Response(IBFIPHost), that it sends to the node 11a. The gateway 13 includes the iBF collector field, initially comprising the newly created LIT that is used to find the corresponding IP address of the external IP node 16. When the node 111a receives the response message, the node 11a acquires the collected iBF representation from the message. This specific iBF representation may be regarded as an "address" to the iphost.example.com that it resolved.

S307: The node 11a sends a data request message, Request(dst: IBFIOHost) DATA, using the received iBF representation.

S308: The gateway 13 receives the data request message and matches the LITs of its database to the destination iBF representation in the received message. Once the gateway 13 finds the correct mapping, the gateway 13 creates an IP header to the message, sets the retrieved IP address to the destination field and in the source field it adds the IP prefix merged with the iBF representation that was stored corresponding to the LIT. This mapping may also be performed according to other embodiments as disclosed herein.

S309: The gateway 13 sends a message, IP(DST: 3ffe: abba::host) DATA, as generated in step S308 to the IP node 16. This message is received by the IP host.

S310: The IP node 16 responds to the message received in step S309 by sending a message, IP(DST: 3ffe:123::IBF) DATA, to the gateway 13.

S311: The gateway 13 removes the IP prefix from the IP address of the node 11a and uses the suffix as the iBF representation towards the node 11a.

S312: The gateway 13 sends a response message to the node 11a comprising data; Response(IBFHost) DATA.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for network address translation between in-packet Bloom Filter, iBF, representations used in a first network and Internet Protocol, IP, addresses used in a second network, the method being performed by a gateway not in the first network, comprising the steps of:
   acquiring an iBF representation of a node within the first network; and
   embedding an indication of said iBF representation in an IP address used in the second network for the node, to enable translation of said iBF representation of the node in the first network to the IP address of the node in the second network;
   wherein said indication is determined by:
      mapping said iBF representation to a suffix of said IP address of the node; and
      storing said mapping in a look-up table, wherein said indication is defined by said mapping.

2. The method according to claim 1, wherein a first part of said IP address of the node comprises at least a partial IP address of said gateway.

3. The method according to claim 2, wherein said first part is a prefix of said IP address of the node.

4. The method according to claim 1, wherein a second part of said IP address of the node comprises said indication of said iBF representation.

5. The method according to claim 4, wherein said second part is said suffix of said IP address of the node.

6. The method according to claim 4, wherein said indication is said iBF representation itself.

7. The method according to claim 1, further comprising: storing said IP address of the node in a domain name system, DNS, server.

8. The method according to claim 1, wherein said iBF representation of the node is based on information provided by a path computational element, PCE.

9. The method according to claim 1, wherein said iBF representation of the node is based on a separate iBF collector field.

10. The method according to claim 1, wherein said iBF representation of the node identifies a path from said gateway to the node.

11. The method according to claim 1, further comprising:
   receiving a packet comprising said IP address of the node from an IP node;
   extracting said iBF representation from said IP address of the node; and
   transmitting said packet using said iBF representation towards said node.

12. The method according to claim 11, wherein extracting said iBF representation comprises:
   removing an IP header from said packet and retrieving said iBF representation from said IP address.

13. The method according to claim 11, wherein extracting said iBF representation comprises:
   performing a table look-up to map said IP address to said iBF representation.

14. The method according to claim 1, further comprising:
   receiving a destination address query of an IP node from the node;
   performing a domain name system, DNS, query of said IP node so as to receive an IP address of said IP node; and
   generating a local link identifier, LID, pointing to said IP address of said IP node, to map said LID to said IP address of said IP node.

15. The method according to claim 14, further comprising:
   sending a response to the destination address query to the node.

16. A gateway for network address translation between in-packet Bloom Filter, iBF, representations used in a first network and Internet Protocol, IP, addresses used in a second network, the gateway not in the first network comprising a processing unit configured to:

acquire an iBF representation of a node within the first network; and embed an indication of said iBF representation in an IP address used in the second network for the node, to enable translation of said iBF representation of the node in the first network to the IP address of the node in the second network;

wherein said indication is determined by:

mapping said iBF representation to a suffix of said IP address of the node; and storing said mapping in a look-up table, wherein said indication is defined by said mapping.

17. A non-transitory computer readable medium comprising a computer program for network address translation between in-packet Bloom Filter, iBF, representations used in a first network and Internet Protocol (IP) addresses used in a second network, the computer program comprising computer program code which, when run on a processing unit of a gateway not in the first network, causes the processing unit to:

acquire an iBF representation of a node within the first network; and embed an indication of said iBF representation in an IP address used in the second network for the node, to enable translation of said iBF representation of the node in the first network to the IP address of the node in the second network;

wherein said indication is determined by:

mapping said iBF representation to a suffix of said IP address of the node; and storing said mapping in a look-up table, wherein said indication is defined by said mapping.

* * * * *